United States Patent
Oikawa et al.

(10) Patent No.: US 11,619,615 B2
(45) Date of Patent: Apr. 4, 2023

(54) FIELD FLOW FRACTIONATION DEVICE

(71) Applicant: SHIMADZU CORPORATION, Kyoto (JP)

(72) Inventors: Yukio Oikawa, Kyoto (JP); Shigeyoshi Horiike, Kyoto (JP); Maiko Nakaya, Kyoto (JP); Masaki Kanai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 1050 days.

(21) Appl. No.: 16/334,469

(22) PCT Filed: Sep. 14, 2017

(86) PCT No.: PCT/JP2017/033264
§ 371 (c)(1),
(2) Date: Nov. 4, 2019

(87) PCT Pub. No.: WO2018/056166
PCT Pub. Date: Mar. 29, 2018

(65) Prior Publication Data
US 2021/0372972 A1    Dec. 2, 2021

(30) Foreign Application Priority Data
Sep. 20, 2016 (JP) .............................. JP2016-182630

(51) Int. Cl.
*G01N 30/00*  (2006.01)
*B03B 5/62*   (2006.01)

(52) U.S. Cl.
CPC ........... *G01N 30/0005* (2013.01); *B03B 5/62* (2013.01); *G01N 2030/003* (2013.01)

(58) Field of Classification Search
CPC ............................................... G01N 2030/003
See application file for complete search history.

(56) References Cited

U.S. PATENT DOCUMENTS

| | | | | |
|---|---|---|---|---|
| 6,136,171 A | * | 10/2000 | Frazier | B81C 1/00357 209/127.1 |
| 6,192,764 B1 | * | 2/2001 | Jiang | G01N 30/0005 73/865.5 |
| 6,365,050 B1 | * | 4/2002 | Cauchon | G01N 30/0005 210/800 |

FOREIGN PATENT DOCUMENTS

JP    2008-000724 A    1/2008

OTHER PUBLICATIONS

International Search Report of PCT/JP2017/033264 dated Dec. 19, 2017 [PCT/ISA/210].

* cited by examiner

*Primary Examiner* — Daniel S Larkin
(74) *Attorney, Agent, or Firm* — Sughrue Mion, PLLC

(57) ABSTRACT

Field flow fractionation device includes a channel switching unit for switching the connection of a second carrier fluid supply unit to any one of the second inlet port of an upper separation cell, the first inlet port of a lower separation cell, or the second inlet port of a lower separation cell. Furthermore, the second carrier fluid supply unit is connected to the second inlet port of an upper separation cell during the process of focusing to generate flow of carrier fluid counter to the flow of carrier fluid from the first inlet port within the upper separation cell, whereas the second carrier fluid supply unit is connected to the first inlet port or the second inlet port of a lower separation cell after conclusion of focusing in the upper separation cell.

4 Claims, 3 Drawing Sheets

FIELD FLOW FRACTIONATION DEVICE

CROSS REFERENCE TO RELATED APPLICATIONS

This application is a National Stage of International Application No. PCT/JP2017/033264 filed Sep. 14, 2017, claiming priority based on Japanese Patent Application No. 2016-182630 filed Sep. 20, 2016.

TECHNICAL FIELD

The present invention relates to a field flow fractionation device that uses field flow fractionation to separate and fractionate microparticles contained in a fluid.

BACKGROUND ART

Prior to now, so-called cross-flow field flow fractionation has been known as a technique for separating and detecting or fractionating solution-dispersed microparticles of a broad range of particle sizes between on the order of 1 nm and 50 µm (for example, see Patent Literature 1).

Flow field flow fractionation devices that use an asymmetrical channel structure have separation channels that serve to separate a sample. One of the walls forming the separation channel is a micropore-bearing semipermeable membrane (also called a separation membrane) made of RC (regenerated cellulose), PES (polyethersulfone), or the like, while a porous plate called a frit is provided on the outside of this semipermeable membrane. When carrier fluid is introduced into the channel, it traverses this wall and generates flow (cross-flow) orthogonal to the flow traveling from the inlet port to the outlet port of the separation channel (channel flow).

If necessary, flow traveling counter to the channel flow (focus flow) can be formed in the separation channel. After the carrier fluid has traversed the separation membrane serving as the wall of the separation channel, it is discharged from an outlet port (discharge port) separate from the outlet port of the separation channel. The quantity of discharge from the frit is controlled by an MFC (mass flow controller) provided on the discharge port side.

A sample is introduced into the separation channel through the inlet port by means of a sample injector. At this time, a counter flow (focus flow) is formed within the separation channel by the channel flow of carrier fluid supplied from the inlet port and carrier fluid supplied from the port on the outlet port side, which is separate from the inlet port, causing the sample introduced into the separation channel to be collected at the boundary between the channel flow and the focus flow. This is referred to as focusing.

Sample particles focused at the counterflow boundary by focusing have different hydrodynamic diameters, giving rise to differences in the diffusion coefficient, which causes more readily diffused particles to be gathered at the top of the separation channel.

This is referred to as relaxation. Subsequently, focus flow is stopped, causing the flow within the separation channel to be reduced to only channel flow and cross-flow, at which point Stokes flow causes sample particles to be discharged from the separation channel via the outlet port in sequence from smallest to largest. A detector such as an ultraviolet absorption detector is connected to the outlet port of the separation channel, and a fractogram is obtained by using the detector to measure the absorbance, e.g., in the ultraviolet region (190 nm-280 nm), in sequence from smallest to largest sample particles.

PRIOR ART LITERATURE

Patent Literature (Patent literature 1) Japanese Unexamined Patent Application Publication 2008-000724

SUMMARY OF THE INVENTION

To perform sequential analysis of samples using a single field flow fractionation device, it is necessary to perform conditioning of the device after analysis of one sample is complete, prior to beginning analysis of the next sample. This conditioning takes on the order of 10~15 minutes, so including conditioning, analysis of a single sample can take of upwards of 30 minutes. This makes sequential analysis using a single field flow fractionation device inefficient, resulting in the problem that a considerable amount of time is required to analyze multiple samples.

One conceivable solution is to perform analysis using several field flow fractionation devices in parallel, but this results in the consumption of a large quantity of solvent, which is used as the carrier fluid. Using several field flow fractionation devices also increases costs by complicating the device configuration.

The present invention consequently has as its objective to improve the analysis efficiency of a field flow fractionation device while keeping the device configuration simple and suppressing cost.

Means of Solving the Problem

The field flow fractionation device of the present invention includes a separation cell group, a first carrier fluid supply unit, a second carrier fluid supply unit, a channel a switching unit, and a control unit. The separation cell group is comprised of a plurality of separation cells, and the plurality of separation cells define at least one separation cell pair consisting of an upper separation cell and a lower separation cell.

A separation cell includes a separation channel for receiving the flow of carrier fluid and separating a sample therefrom, a first inlet port leading to one end to the separation channel, a second inlet port located closer to the other end of the separation channel with respect to the first inlet port, and an effluent chamber adjoining the separation channel across a separation membrane that is carrier-fluid-permeable but sample-impermeable. The first carrier fluid supply unit is connected to the first inlet port of the upper separation cell of the separation cell group, and supplies carrier fluid to the separation channel of said upper separation cell. The second carrier fluid supply unit is provided separately from the first carrier fluid supply unit, and feeds carrier fluid independently from the first carrier fluid supply unit.

As described above, in a field flow fractionation device, the supply of carrier fluid through a second inlet port located closer to the other end (the outlet port side) of the separation channel with respect to the first inlet port results in the formation of focus flow, which runs counter to the channel flow of carrier fluid supplied from the first inlet port, causing a process known as focusing, whereby a sample introduced into the separation channel is collected at the boundary between the channel flow and the focus flow. Prior to now, the second carrier fluid supply unit, which supplies carrier fluid into the separation channel via the second inlet port, ceased operation upon conclusion of focusing. In short, the second carrier fluid supply unit entered standby mode until the next time focusing was performed.

In contrast, the present invention uses the second carrier fluid supply unit to supply carrier fluid to a different separation cell (the lower separation cell), rather than following convention and placing it in standby mode until the next time focusing is performed. For this reason, the field flow fractionation device of the present invention includes a switching unit for switching the connection of the second carrier fluid supply unit to any one of the second inlet port of the upper separation cell, the first inlet port of the lower separation cell, or the second inlet port of the lower separation cell, and includes a control unit for controlling the channel switching unit to connect the second carrier fluid supply unit to the second inlet port of the upper separation cell during the process of focusing to generate flow of carrier fluid counter to the flow of carrier fluid from the first inlet port within the upper separation cell, and to connect the second carrier fluid supply unit to the first inlet port or the second inlet port of the lower separation cell after the process of focusing in the upper separation cell.

Alternately, the channel switching unit can switch the second carrier fluid supply unit from being connected to any one of the second inlet port of the upper separation cell or the first inlet port of the lower separation cell. In this case, the control unit performs operational control of the channel switching unit in such a way that the second carrier fluid supply unit connects to the first inlet port of the lower separation cell after the process of focusing in the upper separation cell.

In the case, the separation cell preferably also includes a discharge port for discharging carrier fluid in the effluent chamber, such that, during the process of focusing of the lower separation cell, carrier fluid from the effluent port of the upper separation cell is supplied from the second inlet of the lower separation cell to the separation channel of said lower separation cell. Adopting this configuration renders it possible to reduce the quantity of solvent used as carrier fluid by making it possible to re-use the carrier fluid discharged from the discharge port of the upper separation cell as the carrier fluid for focusing of the lower separation cell.

Alternately, the channel switching unit can switch the second carrier fluid supply unit from being connected to any one of the second inlet port of the upper separation cell or the second inlet port of the lower separation cell. In this case, the control unit performs operational control of the channel switching unit in such a way that the second carrier fluid supply unit connects to the second inlet port of the lower separation cell after the process of focusing in the upper separation.

Because the field flow fractionation device of the present invention is furnished with a switching portion that switches the aforesaid second carrier fluid supply portion from being connected to any one port from among either the second inlet port of the upper separation cell, the inlet port of the lower separation cell, or the second inlet port of the lower separation cell, and a control portion that performs operational control of the channel switching portion connects the second carrier fluid supply portion to the aforesaid second inlet port of the upper separation cell when performing focusing to generate flow of carrier fluid counter to the flow of carrier fluid from the inlet port within the upper separation cell, and connects the second carrier fluid supply portion to the aforesaid inlet port or second inlet port of the aforesaid lower separation cell after focusing has concluded in the upper separation cell, there is no need to provide a stand-alone supply portion for supplying carrier fluid to the inlet port or second inlet port of the lower separation cell, which makes it possible to perform analysis in parallel using the upper separation cell and lower separation cell. This makes it possible to improve analysis efficiency while keeping the device configuration simple and suppressing cost.

EMBODIMENT OF THE INVENTION

An embodiment of the field flow fractionation device will be described using the drawings.

The schematic configuration of the field flow fractionation device in this embodiment will be described using FIG. 1.

The field flow fractionation device in this embodiment example is furnished with an upper separation cell 2*a*, lower separation cell 2*b*, first carrier fluid supply portion 100, second carrier fluid supply portion 200, channel switching portion 300, and control portion 400. Upper separation cell 2*a* and lower separation cell 2*b* together constitute one pair of separation cells. The field flow fractionation device is furnished with a separation cell group comprised of a plurality of separation cells including at least this pair of separation cells 2*a*, 2*b*.

Figure 1:
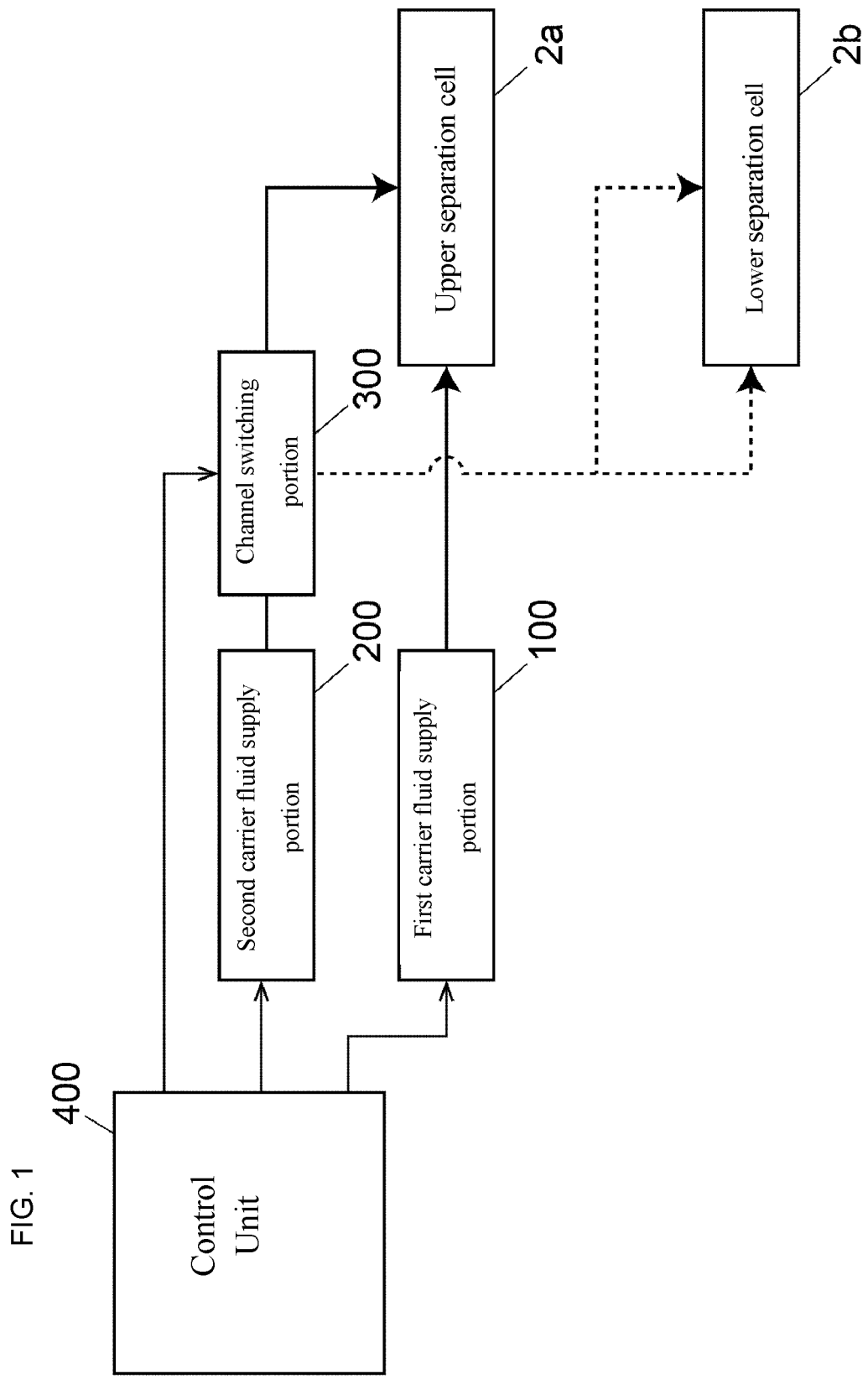
FIG. 1 Block diagram schematically indicating an embodiment example of the field flow fractionation device.

Although not shown in FIG. 1, both upper separation cell 2*a* and lower separation cell 2*b* include a separation channel for separating a sample therefrom, a first inlet port for introducing carrier fluid into the separation channel from a location at one end of said separation channel, and a second inlet port for introducing carrier fluid into the separation channel from a location closer to the other end of the separation channel with respect to the first inlet port.

The first carrier fluid supply portion 100 supplies carrier fluid into the separation channel of upper separation cell 2*a* via the inlet port of upper separation cell 2*a*. The second carrier fluid supply portion 200 supplies carrier fluid into the separation channel of upper separation cell 2*a* via the second inlet port of upper separation cell 2*a*, while a channel switching portion 300 is interposed between second carrier fluid supply portion 200 and the second inlet port of upper separation cell 2*a*.

Channel switching portion 300 switches the connection of second carrier fluid supply portion 200 between the second inlet port of upper separation cell 2*a* and the inlet port or second inlet port of lower separation cell 2*b*. In short, carrier fluid is able to be supplied to the separation channel of lower separation cell 2*b* from the inlet port or second inlet port of lower separation cell 2*b* using second carrier fluid supply portion 200, which supplies carrier fluid into the separation channel of upper separation cell 2*a* via the second inlet port of upper separation cell 2*a*.

The operation of first carrier fluid supply portion 100, second carrier fluid supply portion 200, and channel switching portion 300 is controlled by control portion 400.

Figure 2:
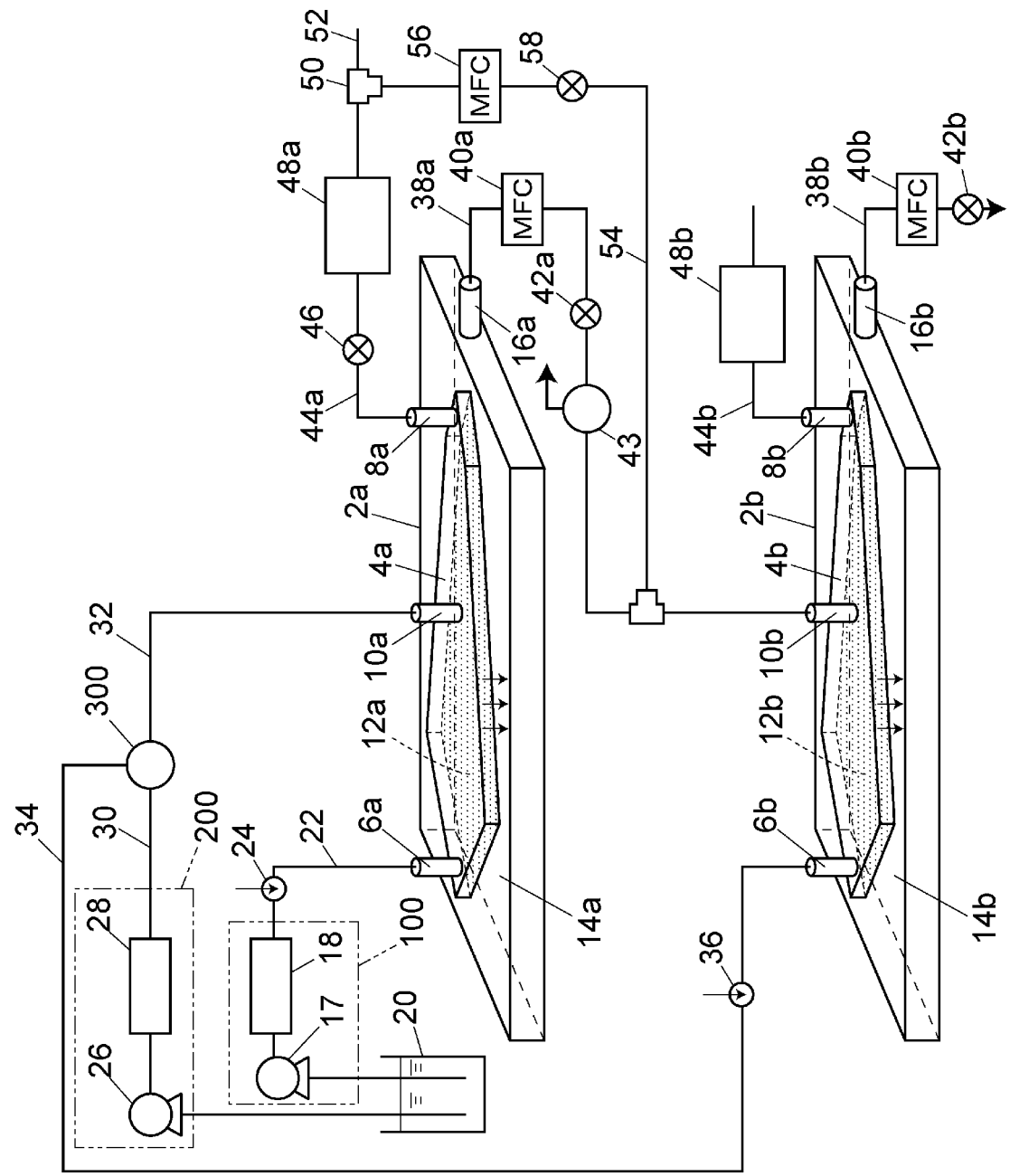
FIG. 2 Channel configuration diagram showing an example of the channel configuration of the same embodiment example.

An example of the specific configuration of this embodiment will be described using FIG. 1 as well as FIG. 2.

The separation cell 2a includes a separation channel 4a for separating a sample therefrom, and this separation channel 4a leads to a first inlet port 6a, outlet port 8a, and second inlet port 10a. Inlet port 6a leads to one end of separation channel 4a, while outlet port 8a leads to the other end of separation channel 4a. Second inlet port 10a is provided in a location between inlet port 6a and outlet port 8a. Although not shown in the drawings, separation channel 4a is formed on the interior of a block comprised, e.g., of a plurality of laminated substrates, and ports 6a, 8a, and 10a each consist of a hole provided in this block.

The separation channel 4a has a semi-rhomboid shape. The one end and other end of separation channel 4a are pointed, and the width dimension of its planar shape first widens moving from the one end to the other end, before narrowing along the way and then converging to a point at the other end.

Effluent chamber 14a is provided adjacent to separation channel 4a across a separation membrane 12a. Separation membrane 12a is a porous membrane that permits traversal of carrier fluid but does not permit traversal of sample. Effluent chamber 14a leads to port 16a, such that carrier fluid that has flowed from separation channel 4a into effluent chamber 14a after traversing separation membrane 12a is discharged from effluent chamber 14a via discharge port 16a.

The separation cell 2b, in the same way as separation cell 2a, includes a separation channel 4b, inlet port 6b, outlet port 8b, second inlet port 10b, separation membrane 12b, effluent chamber 14b, and discharge port 16b.

First carrier fluid supply portion 100 is connected to inlet port 6a of upper separation cell 2a via inlet channel 22. First carrier fluid supply portion 4 is furnished with a feed pump 17 and flow meter 18. The operation of feed pump 17 is controlled based on measurements made by flow meter 18 in such a way as to feed carrier fluid stored in vessel 20 at the designated flow rate. Sample injection portion 24 is provided along inlet channel 22 between first carrier fluid supply portion 4 and inlet port 6a. In sample injection portion 24, sample injected into inlet channel 22 is introduced into separation channel 4a together with carrier fluid fed from feed pump 17.

When carrier fluid is supplied into separation channel 4a from inlet port 6a, this forms a flow of carrier fluid from inlet port 6a towards outlet port 8a within separation channel 4a.

Below, the flow of carrier fluid from inlet port 6a to outlet port 8a in separation channel 4a is referred to as "channel flow," the flow of carrier fluid in a direction counter to this channel flow is referred to as "focus flow," and the flow in a direction orthogonal to channel flow is referred to as "cross-flow." Similarly, in separation channel 4b, the flow of carrier fluid from inlet port 6b to outlet port 8b is referred to as "channel flow," the flow of carrier fluid in a direction counter to this channel flow is referred to as "focus flow," and the flow in a direction orthogonal to channel flow is referred to as "cross-flow." Focus flow is flow formed by supplying carrier fluid from second inlet ports 10a, 10b to separation channels 4a, 4b. Cross-flow is flow formed by carrier fluid traversing separation membranes 12a, 12b.

Second carrier fluid supply portion 200 is connected to channel switching portion 300 via carrier fluid supply channel 30. Channel switching portion 300 is comprised, for example, of a 3-way solenoid valve, which switches carrier fluid supply channel 30 to one of either focus flow channel 32 or first recycle channel 34. Focus flow channel 32 is connected to second inlet port 10a of upper separation cell 2a. First recycle channel 34 is connected to inlet port 6b of lower separation cell 2b. Sample injection portion 36 is provided on first recycle channel 34.

Supplying carrier fluid into separation channel 4a via second inlet port 10a causes focus flow to form within separation channel 4a. Supplying carrier fluid into separation channel 4b via inlet port 6b causes channel flow to form within separation channel 4b.

Detection channel 44a is connected to outlet port 8a of upper separation cell 2a. Check valve 46 and detector 48a are provided along detection channel 44a. Detection channel 44a is split into an outlet channel 52 and second recycle channel 54 by a 3-way joint 50 downstream from detector 48a. Outlet channel 52 leads to a drain. Second recycle channel 54 is connected to second inlet port 10b of lower separation cell 2b. Mass flow controller 56 and check valve 58 are provided along second recycle channel 54.

Discharge port 16a of upper separation cell 2a is connected to discharge channel 38a. Discharge channel 38a is connected to second inlet port 10b of lower separation cell 2b via 3-way solenoid valve 43. Mass flow controller 40a and check valve 42a are provided along discharge channel 38a. Either the channel leading to the drain or the channel leading to vessel 20 is connected to 3-way solenoid valve 43 in addition to discharge channel 38a and the channel leading to second inlet port 10b.

Because discharge channel 38a and second recycle channel 54 are connected to second inlet port 10b of lower separation cell 2b, at least a portion of the carrier fluid flowing out of outlet port 8a of upper separation cell 2a and carrier fluid flowing out of discharge port 16a is able to be supplied into separation channel 4b from second inlet port 10b. In short, focus flow is able to be formed within separation channel 4b by using the effluent from upper separation cell 2a.

Detection channel 44b is connected to outlet port 8b of lower separation cell 2b. Detector 48b is provided along detection channel 44b. Furthermore, discharge channel 38b is connected to discharge port 16b of lower separation cell 2b. Mass flow controller 40b and check valve 42b are provided along discharge channel 38b. Discharge channel 38b may lead to a drain or may return the carrier fluid to vessel 20. Enabling carrier fluid to be returned to vessel 20 via discharge channel 38a makes it possible to reduce the quantity of carrier fluid effluent.

The operation of the field flow fractionation device in this embodiment will be described.

Analysis of the sample in upper separation cell 2a commences prior to analysis from lower separation cell 2b. First, carrier fluid from first fluid supply portion 100 is supplied via inlet port 6a into separation channel 4a of upper separation cell 2a at a pre-set first flow rate for focusing (e.g. 0.05 mL/min), and a sample injected into sample injection portion 24 is also introduced into separation channel 4a via inlet port 6a. At this time, carrier fluid supply channel 30 is connected to focus flow channel 32, so carrier fluid from second carrier fluid supply portion 200 is supplied into separation channel 4a via second inlet port 10a at a pre-set second flow rate for focusing (e.g. 4.45 mL/min), thereby forming focus flow within separation channel 4a. This focusing flow causes a sample introduced from inlet port 6a to be collected (focused) at the border between the flow of carrier fluid from inlet port 6a and the flow of carrier fluid from second inlet port 10a. In addition, cross-flow is generated within separation channel 4a by the carrier fluid traversing separation membrane 12, such that relaxation of the sample occurs at the border between the flow of carrier fluid from inlet port 6a and the flow of carrier fluid from second inlet port 10a.

After focusing and relaxation have concluded, channel switching portion 300 is switched, connecting carrier fluid supply channel 30 to first recycle channel 34 and changing the carrier fluid feed rate from second carrier fluid supply portion 200 to the first flow rate for focusing (e.g. 0.05 mL/min). This causes carrier fluid to be supplied into separation channel 4a from inlet port 6b of lower separation cell 2b, whereupon analysis commences in lower separation cell 2b. As in the case of upper separation cell 2a, a sample is injected into first recycle channel 34 through sample injection portion 36, and is introduced into separation channel 4b by means of the carrier fluid flowing through first recycle channel 34 from second carrier fluid supply portion 200.

Again, after focusing and relaxation have concluded, the flow rate of the first carrier fluid supply unit is changed to a pre-set flow rate for separation (e.g. 4.5 mL/min), commencing separation of the sample within upper separation cell 2a. Within separation channel 4a, carrier fluid flowing from inlet port 6a to outlet port 8a generates channel flow, and carrier fluid traversing separation membrane 12a generates cross-flow. Upon being collected at a designated location by focusing and relaxation, the sample then flows towards outlet port 8a under the influence of cross-flow, and particles are introduced into detector 48a to be detected in sequence starting from the particles least influenced thereby.

The flow rate of cross-flow within separation cell 2a can be adjusted by means of mass flow controller 40a. The flow rate of cross-flow, i.e. the flow rate through discharge channel 38a, is adjusted to a pre-set cross-flow rate (e.g. 3.5 mL/min). Simultaneously, the flow rate through second recycle channel 54 is adjusted to a pre-set recycle flow rate (e.g. 0.95 mL/min). In short, carrier fluid from discharge channel 38a and carrier fluid from second recycle channel 54 is supplied to separation channel 4b of lower separation cell 2b via second inlet port 10b at an aggregate flow rate (4.45 mL/min), forming focus flow within separation channel 4b. By this means, focusing is commenced within lower separation cell 2b.

After focusing and relaxation in lower separation cell 2b have concluded, 3-way solenoid valve 43 is switched, disconnecting discharge channel 38a from second inlet port 10b, while simultaneously the flow rate of carrier fluid flowing through second recycle channel 54 is set to zero by mass flow controller 56.

By this means, supply of carrier fluid into separation channel 4b from second inlet port 10b is stopped. The feed rate from second carrier fluid supply portion 200 is then changed to a flow rate for separation (e.g. 4.5 mL/min), commencing separation of the sample in lower separation cell 2b. Within separation channel 4b, carrier fluid flowing from inlet port 6b to outlet port 8b generates channel flow, and carrier fluid traversing separation membrane 12b generates cross-flow. Upon being collected at a designated location by focusing and relaxation, the sample then flows towards outlet port 8b under the influence of cross-flow, and particles are introduced into detector 48b to be detected in sequence starting from the particles least influenced thereby.

Although the embodiment described above is configured such that carrier fluid discharged from outlet port 8a of upper separation cell 2a and carrier fluid discharged from discharge port 16a are used as the carrier fluid serving to form focus flow within separation channel 4b of lower separation cell 2b, the present invention is not limited thereto, and may alternately be configured such that effluent from upper separation cell 2a is not introduced into lower separation cell 2b. In this case, from the perspective of reducing the quantity of carrier fluid effluent, it is preferred that the portion of effluent from upper separation cell 2a not containing sample be returned to vessel 20, but it is not absolutely necessary to adopt such a configuration.

Although the above-described embodiment example is configured in such a way that, once focusing and relaxation have concluded in upper separation cell 2a, carrier fluid from second carrier fluid supply portion 200 is supplied into separation channel 4b from inlet port 6b of lower separation cell 2b, the present invention is not limited thereto. In essence, it is only necessary that second carrier supply portion 200 be used for lower separation cell 2b once it is no longer needed by upper separation cell 2a after focusing and relaxation have concluded in upper separation cell 2a.

Figure 3:
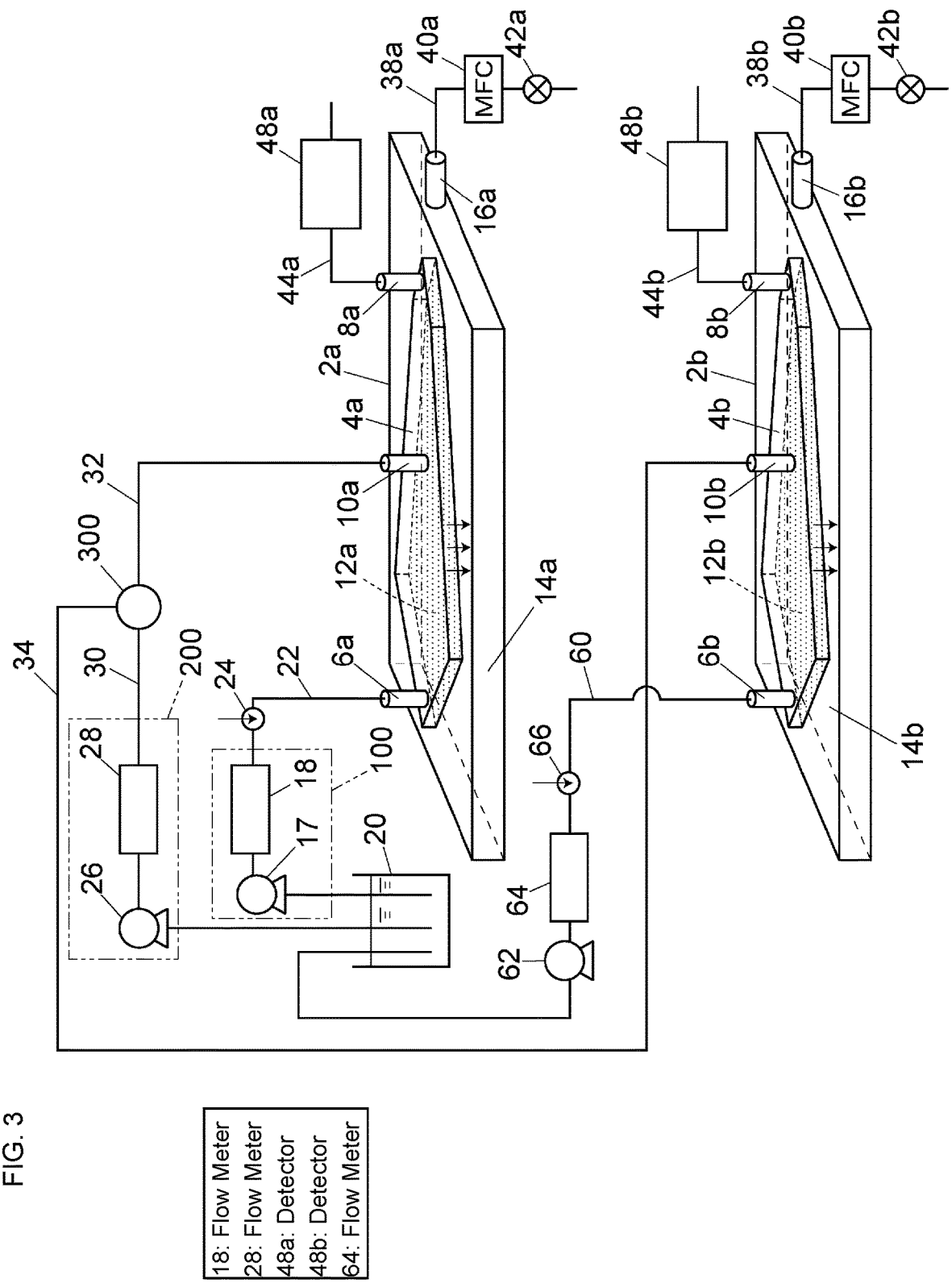
FIG. 3 Channel configuration diagram showing another example of the channel configuration of the same embodiment example.

FIG. 3 shows an embodiment example configured in such a way that, after focusing and relaxation have concluded in upper separation cell 2a, carrier fluid from second carrier fluid supply portion 200 is supplied into separation channel 4b from second inlet port 10b of lower separation cell 2b. In this embodiment example, recycle channel 34 is connected to second inlet port 10b of lower separation cell 2b. Second inlet channel 60 is connected to inlet port 6b of lower separation cell 2b. Provided along second inlet channel 60 is a feed pump 62 that feeds carrier fluid stored in vessel 20, a flow meter 64, and a sample injection portion 66.

In the embodiment in FIG. 3, it is preferred, but not absolutely necessary, that discharge channels 38a and 38b lead to vessel 20 so that carrier fluid discharged from discharge ports 16a and 16b is returned to vessel 20.

DESCRIPTION OF THE SYMBOLS

2a, 2b: Separation cell
4a, 4b: Separation channel
6a, 6b: Inlet port
8a, 8b: Outlet port
10a, 10b: Second inlet port
12a, 12b: Separation membrane
14a, 14b: Effluent chamber
16a, 16b: Discharge port
17, 26, 62: Feed pump
18, 28, 64: Flow meter
20: Vessel for carrier fluid
22: Inlet channel
24, 36, 66: Sample injection portion
30: Carrier fluid supply channel
32: Focus flow channel
34: First recycle channel
38a, 38b: Discharge channel
40a, 40b, 56: Mass flow controller
42a, 42b, 46, 58: Check valve
43, 300: 3-way solenoid valve
44a, 44b: Detection channel
48a, 48b: Detector
50: 3-way joint
52: Outlet channel
54: Second recycle channel
100: First carrier fluid supply unit
200: Second carrier fluid supply unit
400: Control unit

What is claimed is:

1. A field flow fractionation device, comprising:
   a separation cell group comprised of a plurality of separation cells, each including:

a separation channel configured for receiving flow of carrier fluid and separating a sample therefrom, a first inlet port leading to one end to the separation channel, a second inlet port located closer to another other end of the separation channel with respect to the first inlet port, and an effluent chamber adjoining the separation channel across a separation membrane, the separation membrane being carrier-fluid-permeable but sample-impermeable, and the plurality of separation cells defining at least one separation cell pair consisting of an upper separation cell and a lower separation cell;

a first carrier fluid supply unit connected to the first inlet port of the upper separation cell of the separation cell group, the first carrier fluid supply unit configured to supply carrier fluid to the separation channel of said upper separation cell;

a second carrier fluid supply unit provided separately from the first carrier fluid supply unit, the second carrier fluid supply unit configured to feed carrier fluid independently from the first carrier fluid supply unit;

a channel switching unit configured for switching a connection of the second carrier fluid supply unit to any one port of the second inlet port of the upper separation cell, the first inlet port of the lower separation cell, or the second inlet port of the lower separation cell; and a control unit configured for controlling the channel switching unit to connect the second carrier fluid supply unit to the second inlet port of the upper separation cell during a process of focusing to generate flow of carrier fluid counter to the flow of carrier fluid from the first inlet port within the upper separation cell, and to connect the second carrier fluid supply unit to the first inlet port or the second inlet port of the lower separation cell after the process of focusing in the upper separation cell.

2. The field flow fractionation device set forth in claim 1, wherein the channel switching unit switches the connection of the second carrier fluid supply unit to any one of the second inlet port of the upper separation cell or the first inlet port of the lower separation cell; and the control unit performs operational control of the channel switching unit to connect the second carrier fluid supply unit to the first inlet port of the lower separation cell after the process of focusing in the upper separation cell.

3. The field flow fractionation device set forth in claim 2, wherein the upper separation cell further comprises a discharge port configured for discharging carrier fluid in the effluent chamber; and carrier fluid from the discharge port of the upper separation cell is supplied to the separation channel of the lower separation cell from the second inlet of said lower separation cell during the process of focusing in the lower separation cell.

4. The field flow fractionation device set forth in claim 1, wherein the channel switching unit switches the connection of the second carrier fluid supply unit to any one of the second inlet port of the upper separation cell or the second inlet port of the lower separation cell; and the control unit performs operational control of the channel switching unit to connect the second carrier fluid supply unit to the second inlet port of the lower separation cell after conclusion of focusing in the upper separation cell.

* * * * *